(12) United States Patent
Anderson

(10) Patent No.: US 9,321,171 B2
(45) Date of Patent: Apr. 26, 2016

(54) ELECTRICAL BOX LAYOUT TOOL

(71) Applicant: Robert Frederick Anderson, Menominee, MI (US)

(72) Inventor: Robert Frederick Anderson, Menominee, MI (US)

( * ) Notice: Subject to any disclaimer, the term of this patent is extended or adjusted under 35 U.S.C. 154(b) by 46 days.

(21) Appl. No.: 14/271,391

(22) Filed: May 6, 2014

(65) Prior Publication Data

US 2014/0325860 A1 Nov. 6, 2014

Related U.S. Application Data

(60) Provisional application No. 61/819,764, filed on May 6, 2013.

(51) Int. Cl.
| | | |
|---|---|---|
| *G01B 5/24* | (2006.01) | |
| *B25H 7/00* | (2006.01) | |
| *H02G 1/00* | (2006.01) | |
| *H02G 3/00* | (2006.01) | |
| *H02G 3/12* | (2006.01) | |

(52) U.S. Cl.
CPC .. *B25H 7/00* (2013.01); *H02G 1/00* (2013.01); *H02G 3/00* (2013.01); *H02G 3/123* (2013.01)

(58) Field of Classification Search
CPC .......... B25H 7/00; H02G 3/00; F16B 15/007
USPC ............. 33/1 G, 528, 574, DIG. 10; 411/452, 411/455, 458
See application file for complete search history.

(56) References Cited

U.S. PATENT DOCUMENTS

| | | | | | |
|---|---|---|---|---|---|
| 3,116,563 | A * | 1/1964 | Gelbman | .................. | H02G 3/18 248/544 |
| 4,059,905 | A * | 11/1977 | Wieting | .................. | G01B 5/14 33/DIG. 10 |
| 4,382,337 | A * | 5/1983 | Bendick | .................. | B25H 7/04 33/613 |
| 4,589,211 | A * | 5/1986 | Policka | .................. | B25H 7/04 33/DIG. 10 |
| 5,040,304 | A * | 8/1991 | Jackson | .................. | H02G 3/12 33/528 |
| 5,136,788 | A * | 8/1992 | Jackson | .................. | H02G 3/12 33/528 |
| 5,433,043 | A * | 7/1995 | Hibbitt | .................. | B25C 3/006 52/27 |
| 5,588,788 | A * | 12/1996 | Dominguez | .......... | E04G 15/061 220/3.4 |
| 6,055,736 | A * | 5/2000 | Gaston | .................. | B25H 7/04 33/528 |
| 6,283,690 | B1 | 9/2001 | Belter | | |
| 7,682,116 | B2 * | 3/2010 | Cabrele | .................. | F16B 13/001 411/451.1 |
| 7,845,889 | B2 * | 12/2010 | Shelton | .................. | F16B 15/06 411/451.4 |
| 8,066,464 | B1 * | 11/2011 | Van Dyke | ............... | E04F 15/04 411/458 |
| 2007/0160443 | A1 * | 7/2007 | Tseng | .................. | F16B 15/06 411/458 |
| 2007/0286704 | A1 * | 12/2007 | Signor | .................. | A47G 1/168 411/458 |
| 2010/0061825 | A1 * | 3/2010 | Liu | .................. | B25B 13/08 411/388 |
| 2012/0282062 | A1 * | 11/2012 | Scheel | .................. | F16B 15/06 411/389 |
| 2013/0306633 | A1 * | 11/2013 | Belinda | .................. | B65D 51/24 220/212 |
| 2014/0325860 | A1 * | 11/2014 | Anderson | ............... | B25H 7/00 33/528 |

* cited by examiner

*Primary Examiner* — G. Bradley Bennett

(57) ABSTRACT

An electrical box layout tool includes a first pointed end, a first cylindrical section, a stopper, a second cylindrical section, and a second pointed end. The first cylindrical section and the second cylindrical section are concentrically connected with the stopper in such a way that the first cylindrical section and the second cylindrical section are oppositely positioned from each other. The first pointed end is concentrically connected with the first cylindrical section while the second pointed end is concentrically connected with the second cylindrical section. The electrical box layout tool is used to create an opening within a drywall or paneling so that the drywall or paneling is able to accommodate an electrical box that is mounted on a framing stud.

12 Claims, 11 Drawing Sheets

ELECTRICAL BOX LAYOUT TOOL

The current application claims a priority to the U.S. Provisional Patent application Ser. No. 61/819,764 filed on May 6, 2013.

FIELD OF THE INVENTION

The present invention relates generally to the field of construction tools. More specifically, the present invention is an apparatus and a method that eliminates the difficult job of measuring and laying out the drywall sheets for electrical box cut outs.

BACKGROUND OF THE INVENTION

It is a common practice to cover walls and ceilings with drywall or paneling material when constructing a new residential or commercial building. The structure is first roughed in with framing members, for example, "studs", to form walls for various areas, and for supporting wall coverings, such as the drywall or paneling. The studs are also used to hold electrical boxes that house electrical switches, receptacles, and other electrical devices. Electrical wires are strung through the framing studs to the electrical boxes. The studs are then commonly covered with drywall or paneling, where the drywall or paneling acts as the walls of the building. In order to properly install the drywall or paneling, accurate "cut outs", matching the precise sizes and shapes of the various electrical boxes that are attached to the studs must be cut out of the drywall to accommodate the electrical boxes that must extend through the drywall or paneling. These electrical box "cut outs" can be very challenging to measure and lay out on drywall. Often, cutting errors are made during the installation of drywall or paneling, resulting in wasted material, time, and frustration.

It is the object of this invention to provide an improved method of laying out electrical box "cut outs" in drywall sheets by providing a tool that: (1) is constructed of a single piece, (2) is simple to use, (3) requires no adjustments, (4) can produce precise mirror image layouts on both sides of a drywall sheet, (5) works universally for all sizes and shapes of electrical boxes, (6) has a low manufacturing cost, (7) can locate and lay out multiple of ganged electrical boxes, (8) is small to handle and store, (9) is disposable, (10) is re-usable, (11) provides a means for producing precise electrical box "cut outs" in drywall sheets without having to measure, (12) produces "cut outs" free from breakout and roughly cut edges that may require repair or may contaminate painting rollers during the painting of the drywall.

DETAIL DESCRIPTIONS OF THE INVENTION

Figure 1:
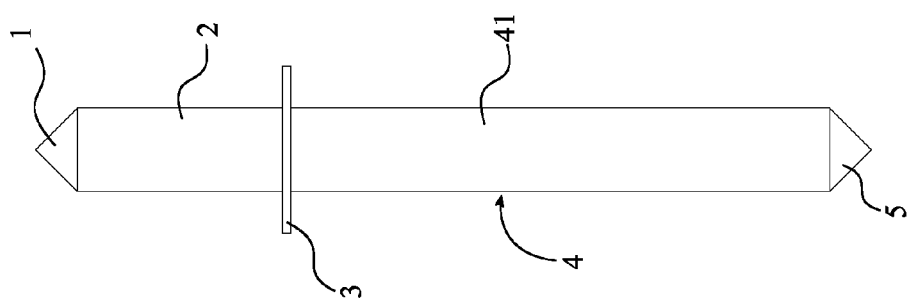
FIG. 1 is a perspective view of a preferred embodiment of the present invention.

All illustrations of the drawings are for the purpose of describing selected versions of the present invention and are not intended to limit the scope of the present invention.

The present invention is an electrical box layout tool, where the present invention assists users to efficiently and precisely install a drywall sheet or paneling over electrical boxes. The present invention is a precisely shaped one piece tool that serves as an inexpensive, disposable, re-usable, simple-to-use, precise, and fool-proof device that permit the users to locate, position, and hold electrical boxes of any size or shape in place on a sheet of drywall or paneling. When a plurality of electrical box layout tools is used within a stationary electrical box 6 that is mounted to a framing stud, the plurality of electrical box layout tools creates shallow holes in the drywall sheet or the paneling so that the users of the present invention are able to use them to accurately outline the exact shape of the stationary electrical box 6 in the exact location on the drywall sheet or the paneling. The outline of the electrical box is traced in mirror image onto both sides of the drywall sheet or paneling without ever having to measure. The traced outlines are then used to make a precise electrical box opening in the drywall sheet or paneling to accommodate the electrical box mounted to framing studs. More specifically, when a plurality of electrical box layout tools is used within fastening holes 7 of the stationary electrical box 6 that is mounted to framing studs, the plurality of electrical box layout tools creates holes on the drywall sheet or the paneling so that the users of the present invention are able to accurately outline the exact shape of the stationary electrical box 6 on the drywall sheet or the paneling. The outlines are made on a front side 91 and a back side 92 of the drywall sheet by utilizing the present invention and at least one arbitrary electrical box 8 in order to cut out an opening 95 within the drywall sheet or the paneling, where the at least one arbitrary electrical box 8 is an unattached and identical electrical box that is identical to the stationary electrical box 6. Then, users can align the opening 95 with the stationary electrical box 6, exposing the stationary electrical box 6 through the drywall 9. The present invention can be made from brightly colored plastic, metal, or any other high strength material that can withstand constant pressure applied from the drywall sheet or the paneling. Even though the electrical box layout tool is herein after described in relation to a drywall 9, the electrical box layout tool can be used with many different paneling materials that are used within the construction industry.

Figure 2:
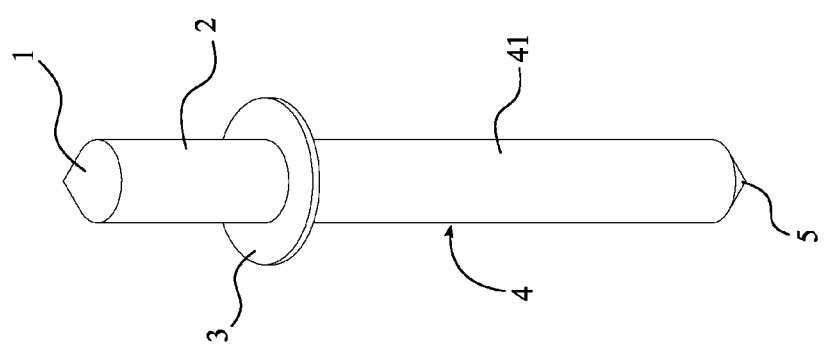
FIG. 2 is a side view of the preferred embodiment of the present invention.

In reference to FIG. 1 and FIG. 2, the present invention comprises a first pointed end 1, a first cylindrical section 2, a stopper 3, a second cylindrical section 4, and a second pointed end 5. The first cylindrical section 2 is adjacently and concentrically connected with the stopper 3 from one end. The second cylindrical section 4 is also adjacently and concentrically connected with the stopper 3, but the second cylindrical section 4 is oppositely positioned from the first cylindrical section 2. The first pointed end 1 is adjacently and concentrically connected with the first cylindrical section 2 opposite of the stopper 3 while the second pointed end 5 is adjacently and concentrically connected with the second cylindrical section 4 and oppositely positioned from the stopper 3. More specifically, the first pointed end 1 and the second pointed end 5 create two shaped edges for the present invention, where the first pointed end 1 and the second pointed end 5 permit the present invention to be easily pressed into the drywall 9 from either direction, the first pointed end 1 or the second pointed end 5. When the first pointed end 1 or the second pointed end 5 is pressed into the drywall 9, the first cylindrical section 2 or the second cylindrical section 4 is easily traversed through the drywall 9 or traversed into the drywall 9 due to the circular shape. Since the stopper 3 is positioned in between the first cylindrical section 2 and the second cylindrical section 4, the stopper 3 is able to limit the distance that the present invention can press into the drywall 9 and the fastening holes 7 of the stationary electrical box 6. The stopper 3 preferably comprises a circular shape within the present invention, but the stopper 3 is not limited to the circular shape and can be any other geometric shape as long as the stopper 3 is radially extended from the first cylindrical section 2 and the second cylindrical section 4.

In reference to FIG. 1 and FIG. 2, in the preferred embodiment of the present invention, the stopper 3 comprises a circular shape, where the diameter of the stopper 3 is generally larger than the diameter of the first cylindrical section 2 and the second cylindrical section 4. The first cylindrical section 2 and the second cylindrical section 4 are finished with a smooth outer surface 41 in order to minimize the pressure that needs to be applied on the drywall 9. Additionally, the first cylindrical section 2 is shorter than the second cylindrical section 4 for the optimal usage of the present invention, where the length of the second cylindrical section 4 is longer than the thickness of any drywall 9.

Figure 3:
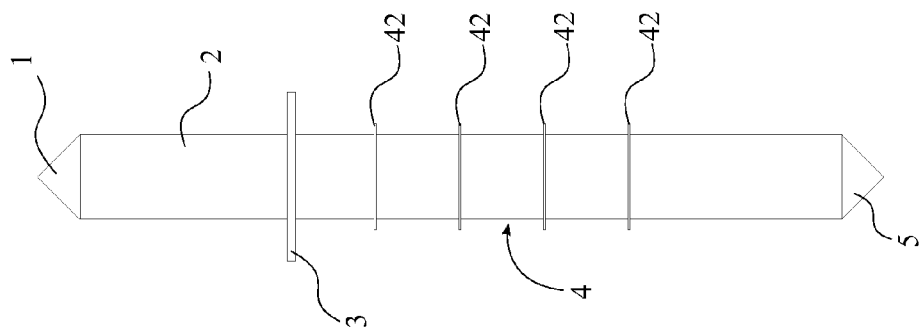
FIG. 3 is a perspective view of a first alternative embodiment of the present invention.
Figure 4:
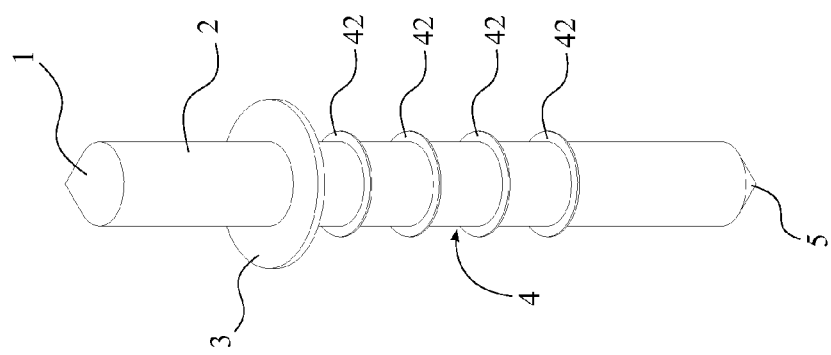
FIG. 4 is a side view of the first alternative embodiment of the present invention.

In reference to FIG. 3 and FIG. 4, a first alternative embodiment of the present invention comprises the same components and configurations similar to the preferred embodiment, but the second cylindrical section 4 further comprises a plurality of flexible circular fins 42. Each of the plurality of flexible circular fins 42 is radially and externally extended around the second cylindrical section 4 in such a way that each of the plurality of flexible circular fins 42 is positioned between the stopper 3 and the second pointed end 5. The plurality of flexible circular fins 42 provides additional friction to the first alternative embodiment during different usage methods and securely retains the first alternative embodiment within the fastening holes 7 of the stationary electrical box 6, if the second cylindrical section 4 is inserted into the fastening holes 7 of the stationary electrical box 6.

Figure 5:
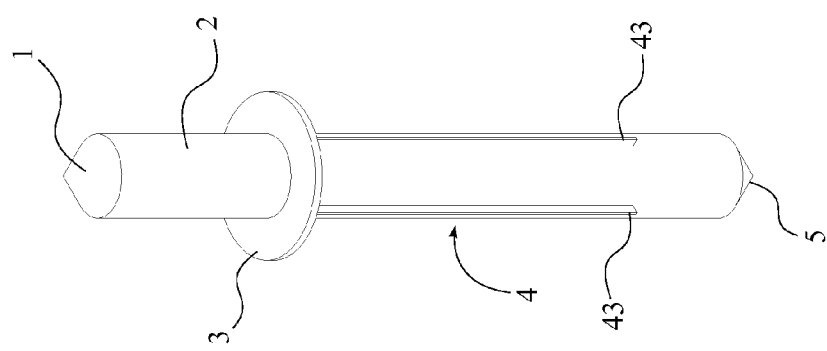
FIG. 5 is a perspective view of a second alternative embodiment of the present invention.
Figure 6:
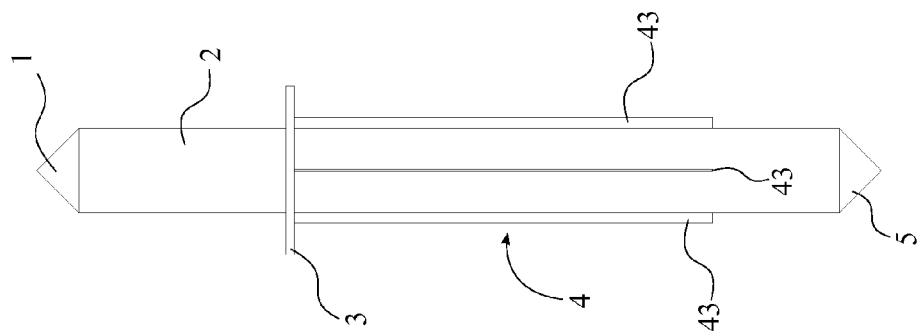
FIG. 6 is a side view of the second alternative embodiment of the present invention.

In reference to FIG. 5 and FIG. 6, a second alternative embodiment of the present invention comprises the same components and configurations similar to the preferred embodiment, but the second cylindrical section 4 further comprises a plurality of flexible linear fins 43. Each of the plurality of flexible linear fins 43 is radially and externally extended along the second cylindrical section 4 in such a way that each of the plurality of flexible linear fins 43 is positioned in between the stopper 3 and the second pointed end 5. Similar to the first alternative embodiment, the plurality of flexible linear fins 43 provides additional friction to the second alternative embodiment during different usage methods and securely retains the second alternative embodiment within the fastening holes 7 of the stationary electrical box 6, if the second cylindrical section 4 is inserted into the fastening holes 7 of the stationary electrical box 6.

The electrical box layout tools are divided into the first cylindrical section 2 and the second cylindrical section 4 by the stopper 3, where the first cylindrical section 2 is the shorter section, and the second cylindrical section 4 is the longer section. The longer section of each of the plurality of electrical box layout tools, which may contain the plurality of flexible linear fins 43 or the plurality of flexible circular fins 42, is pressed within each of the fastening holes 7 of the stationary electrical box 6 that is mounted to the framing studs of a room, until the stopper 3 contacts the face of the fastening holes 7. In so doing, the plurality of flexible linear fins 43 or the plurality of flexible circular fins 42 of the present invention, which permits the present invention to fit slightly varying hole sizes, is compressed and/or deformed, causing outward pressure against the side wall of the fastening holes 7. This securely holds the plurality of electrical box layout tools firmly in place, such that the shorter section of each of the plurality of electrical box layout tools is extended outwardly from the fastening holes 7. Further, the drywall 9 is placed in position, one at a time, at the position where they are to be attached to the framing studs and against the plurality of electrical box layout tools and extending out from the fastening holes 7. Now, hand pressure is applied to the face of the drywall 9 at the location of each of the stationary electrical boxes 6, causing the plurality of electrical box layout tools to puncture the back side 92 of the drywall 9, producing a plurality of shallow holes 93 approximately ¼ to ½ inch deep. The drywall 9 is then removed, exposing all of the plurality of shallow holes 93.

The plurality of shallow holes 93 are precisely drilled through the drywall 9 using a drill guide 12, which is cylindrically shaped, and made of wood, plastic or metal. It has a precision hole through its center that will guide a drill bit passing through it at precisely 90 degrees to its face.

To drill the plurality of shallow holes 93 through the drywall 9, a drill bit clamped in a hand drill is passed through the center hole of the drill guide 12. The end of the drill bit is then located in one of the plurality of shallow holes 93 made in the back side 92 of the drywall 9 by the plurality of electrical box layout tools. The drill guide 12 is then pressed firmly against the surface of the drywall 9. This causes the drill bit to be precisely aligned 90 degrees to the back side 92 of the drywall 9. A precisely located, drilled hole is then drilled through the drywall 9. A slightly larger hole that comprises a larger diameter than the diameter of the plurality of electrical box layout tools is drilled through the drywall 9, to accommodate the plurality of flexible circular fins 42 or the plurality of flexible linear fins 43. In like manner, precisely located drilled holes, 90 degrees to the drywall 9 are drilled at each of the plurality of shallow holes 93 that is punched in the back side 92 of the drywall 9. Next, the plurality of electrical box layout tools that made the plurality of shallow holes 93 is removed from the stationary electrical boxes 6, and the second cylindrical sections 4 are now placed into the drilled holes and are pressed completely through the drywall 9 until the stopper 3 contacts the drywall 9 surface. The plurality of electrical box layout tools is now protruding out from both sides of the drywall 9 and is held snugly in place by the force of the plurality of flexible circular fins 42 or the plurality of flexible linear fins 43 pressing outward against the side wall of the drilled holes. These drilled holes are herein after described as a plurality of guide openings 94.

The fastening holes 7 in at least one arbitrary electrical box 8 identical to the ones mounted to the framing studs are now fit, one at a time, onto the plurality of electrical box layout tools extend out from the back side 92 of the drywall 9. Next, the arbitrary electrical boxes 8 that are guided by the plurality of electrical box layout tools are pressed tight against the drywall 9 surface, where they are precisely positioned and held in place by the plurality of electrical box layout tools. Each shape of the arbitrary electrical boxes 8 is then outlined or traced with a marking pen onto the drywall 9, producing the precise layout lines required to make the opening 95, to fit the electrical boxes 6. In like manner, by means of the plurality of electrical box layout tools, extending out from the front side 91 of the drywall 9, each shape of the arbitrary electrical boxes 8 is precisely located and outlined onto the front side 91 of the drywall 9, creating precise mirror image layouts of the electrical boxes 6. The outlines are then used as guides, and the openings 95 are now precisely made by cutting on the electrical box outlines, using a utility knife to cut slightly deeper than the thickness of the paper surfaces of the drywall 9, on both sides. The openings 95 are then completed by knocking out the center of the electrical box layout with a light hammer blow at the center of the layout.

The openings 95, due to being cut on both sides of the drywall 9, are precise and free from the breakout, rough edges, and loose drywall particles that commonly contaminate paint rollers when the openings 95 of the installed drywall 9 are rolled over during painting of the drywall 9.

These improved methods of producing the openings 95 are expedient, simple, precise and error-proof. They eliminate the frustrating, costly errors resulting in wasted material and time, due to incorrect measurements.

In reference to FIG. 7-FIG. 10, in the first method of using the present invention, the plurality of electrical box layout tools is inserted into the fastening holes 7 of the stationary electrical box 6. More specifically, the second cylindrical sections 4 are inserted into the fastening holes 7 of the stationary electrical box 6 in such a way that only the first cylindrical sections 2 are externally extended from the fastening holes 7 of the stationary electrical box 6. For example, if the stationary electrical box 6 includes four fastening holes 7, the second cylindrical sections 4 of the four electrical box layout tools are inserted into the four fastening holes 7 so that only the first cylindrical sections 2 of the four electrical box layout tools are externally extended from the fastening holes 7 of the stationary electrical box 6. Then the back side 92 of the drywall 9 is pressed against the plurality of electrical box layout tools and the framing stud in order to create the plurality of shallow holes 93 within the drywall 9. More specifically, the first cylindrical sections 2 are pressed into the back side 92 of the drywall 9 as the users apply hand pressure to the front side 91 of drywall 9, where the pressure is applied at the location of the stationary electrical box 6. Then, the drywall 9 is removed away from the framing stud and the stationary electrical box 6. Upon removing the drywall 9, the users have to inspect the positioning of the plurality of electrical box layout tools so that a first outline 10 can be traced in the back side 92 of the drywall 9.

Figure 7:
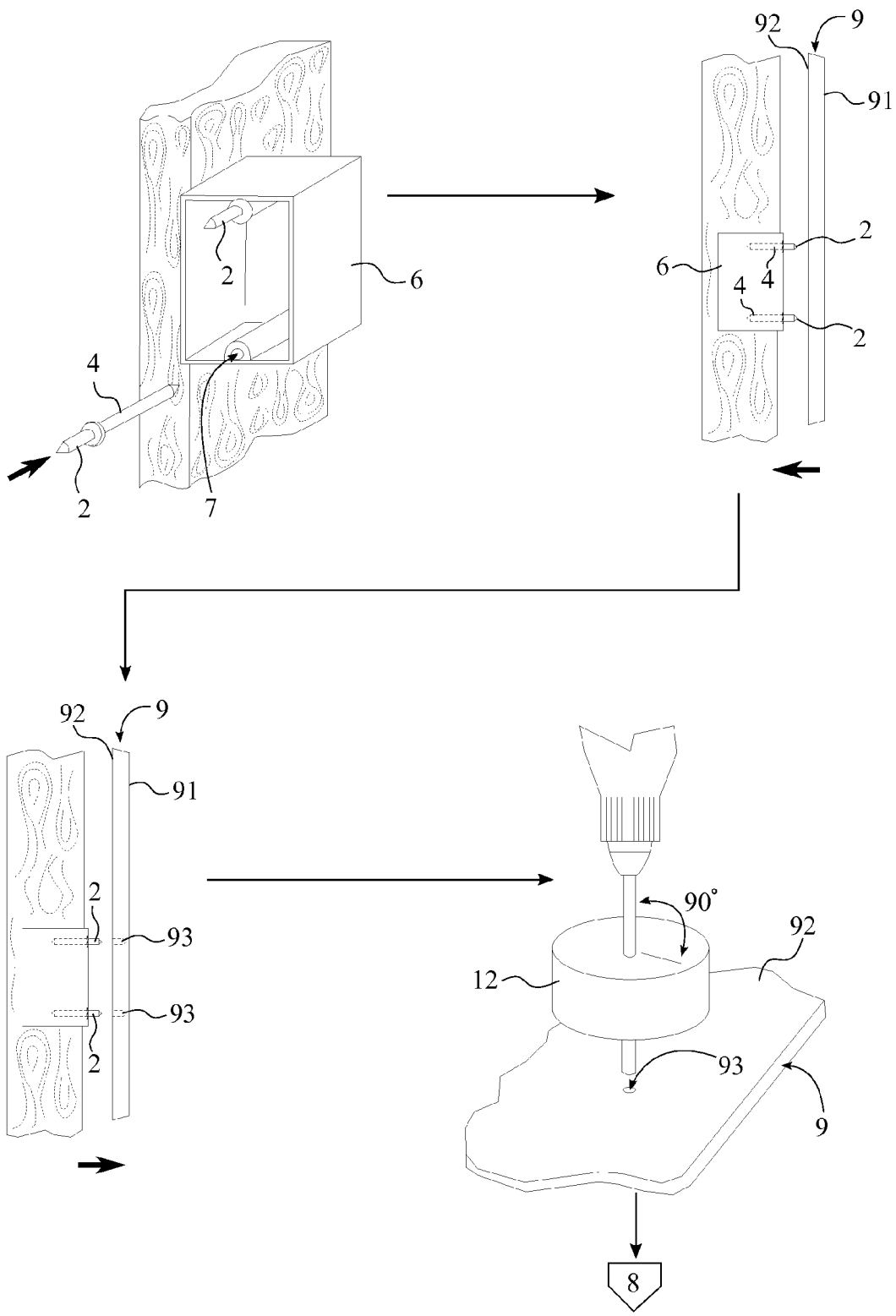
FIG. 7 is an illustration showing a first half for the first method of using the present invention, wherein the electrical box layout tools are retained within the electrical box.
Figure 8:
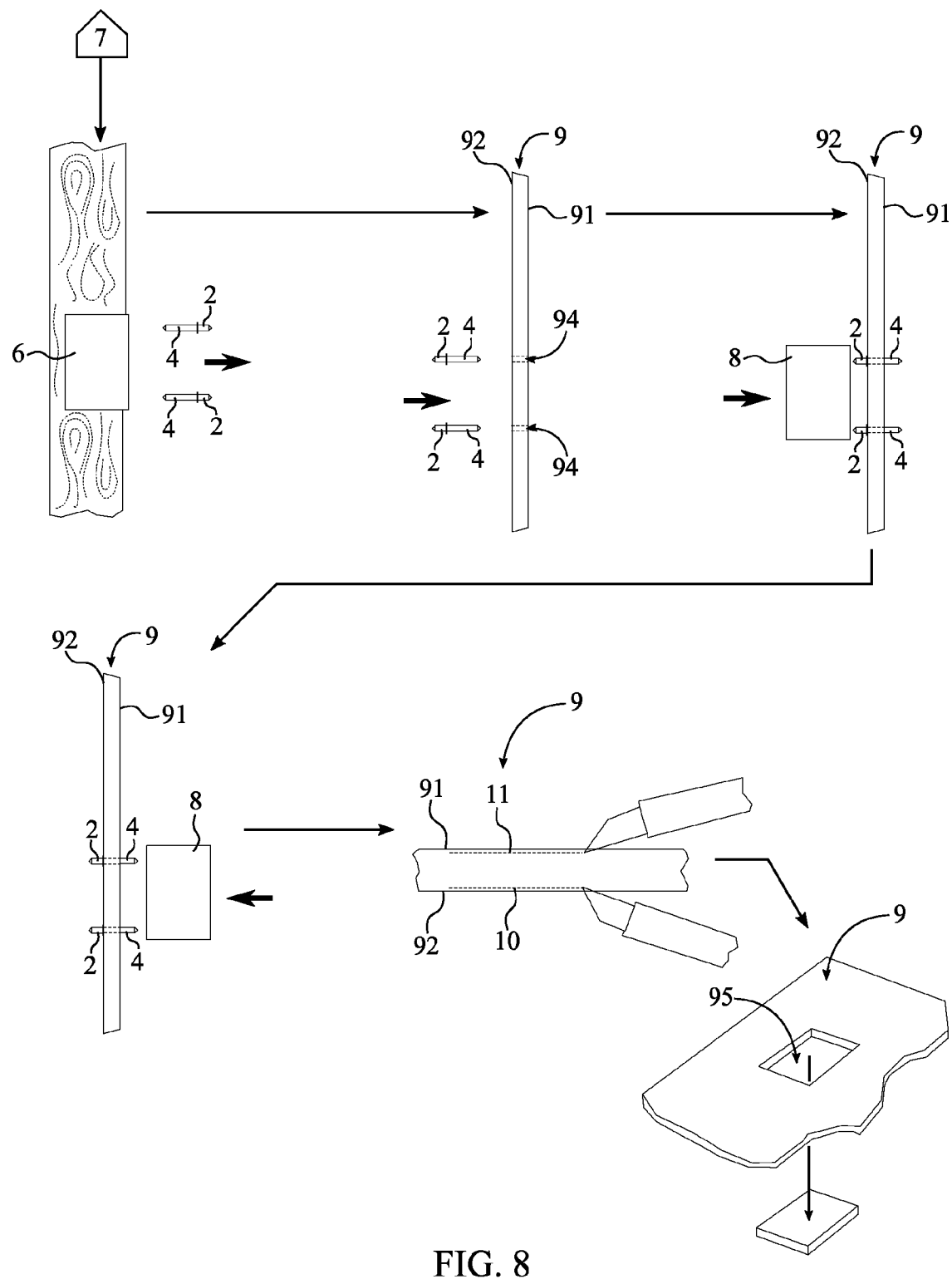
FIG. 8 is an illustration showing a second half for the first method of using the present invention, wherein the electrical box layout tools are retained within the electrical box.

In reference to FIG. 7, if the plurality of electrical box layout tools is positioned within the fastening holes 7 of the stationary electrical box 6, the users are able to visually identify the plurality of shallow holes 93. Then the users can drill through the plurality of shallow holes 93 from the back side 92 of the drywall 9 in order to create the plurality of guide openings 94. Then the plurality of electrical box layout tools is removed from the fastening holes 7 of the stationary electrical box 6, and the second cylindrical sections 4 of the plurality of electrical box layout tools are inserted into the plurality of guide openings 94 from the back side 92 of the drywall 9. More specifically, the second cylindrical sections 4 are inserted through the plurality of guide openings 94 so that the first cylindrical sections 2 are able to extend from the back side 92 of the drywall 9 and the second cylindrical sections 4 are able to extend from the front side 91 of the drywall 9. Then the at least one arbitrary electrical box 8 is engaged with the first cylindrical sections 2 in order to trace the first outline 10.

Figure 9:
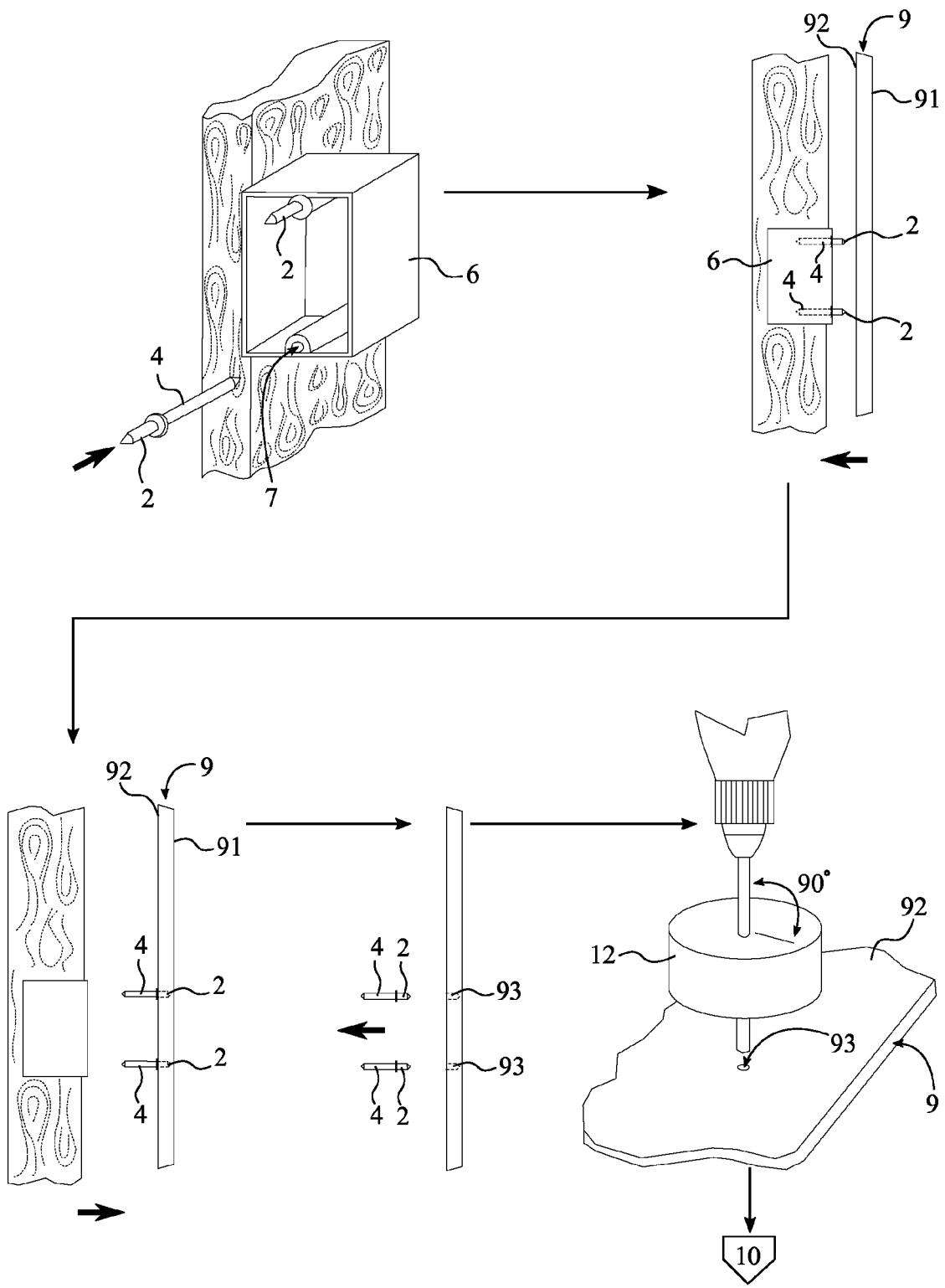
FIG. 9 is an illustration showing a first half for the first method of using the present invention, wherein the electrical box layout tools are retained within the drywall.
Figure 10:
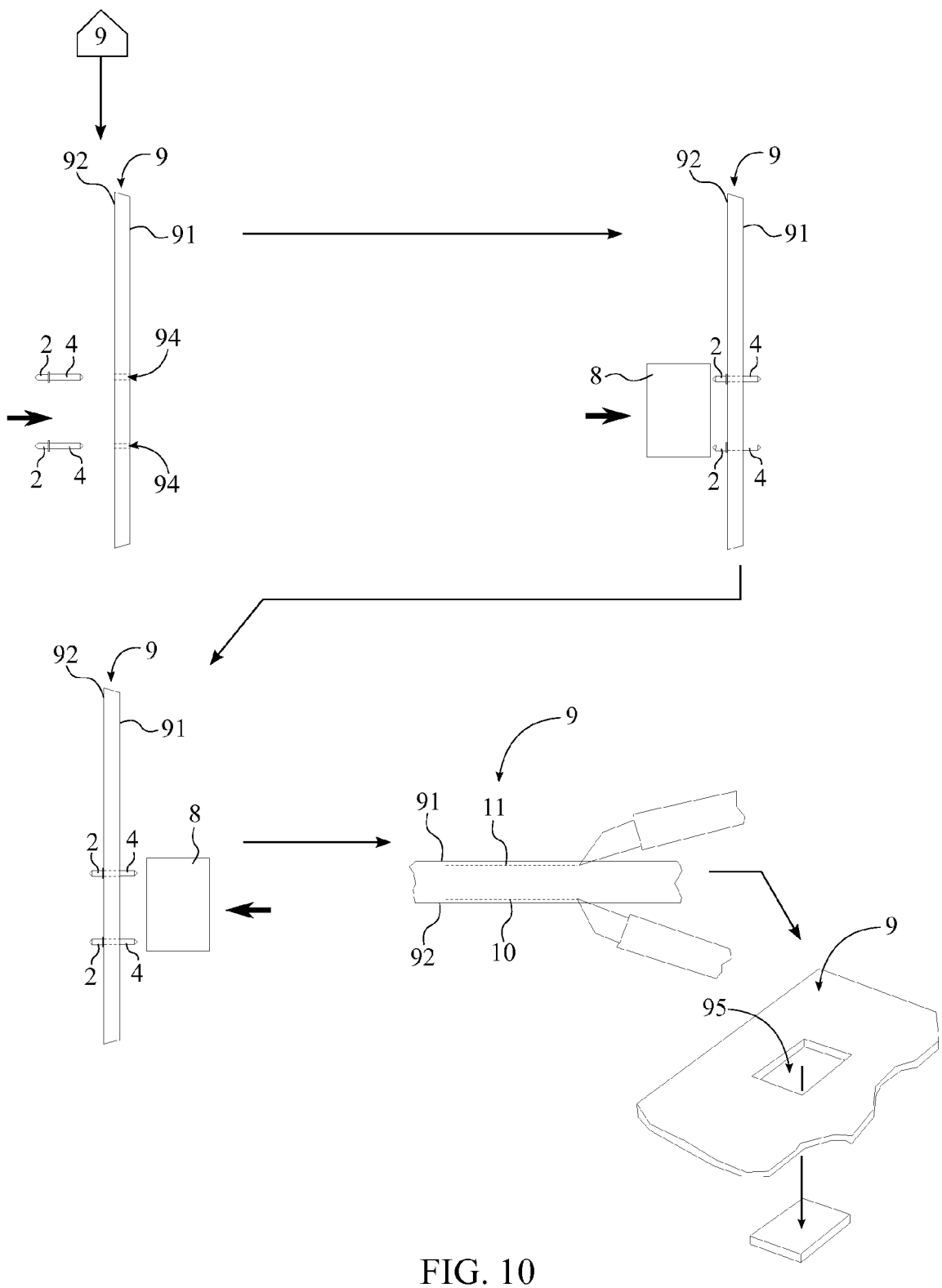
FIG. 10 is an illustration showing a second half for the first method of using the present invention, wherein the electrical box layout tools are retained within the drywall.

In reference to FIG. 9, if the plurality of electrical box layout tools is positioned with the drywall 9, the users are not able to visually identify the plurality of shallow holes 93. Therefore, the users have to remove the plurality of electrical box layout tools from the drywall 9. After removing the plurality of electrical box layout tools from the drywall 9, the plurality of shallow holes 93 is drilled from the back side 92 of the drywall 9 in order to create the plurality of guide openings 94 through the drywall 9. Then the second cylindrical sections 4 of the plurality of electrical box layout tools are inserted into the plurality of guide openings 94 from the back side 92 of the drywall 9. More specifically, the second cylindrical sections 4 are inserted through the drywall 9 so that the first cylindrical sections 2 are able to extend from the back side 92 of the drywall 9 and the second cylindrical sections 4 are able to extend from the front side 91 of the drywall 9. Then the at least one arbitrary electrical box 8 is engaged with the first cylindrical sections 2 in order to trace the first outline 10.

Once the first outline 10 is drawn on to the back side 92 of the drywall 9, the at least one arbitrary electrical box 8 is engaged with the second cylindrical sections 4 extending from the front side 91 of the drywall 9 so that the second outline 11 can be traced on to the drywall 9 creating a mirror-image layout to the first outline 10. Then the drywall 9 is cut through the first outline 10 and the second outline 11 in order to create the opening 95 through the drywall 9.

In reference to FIG. 11-FIG. 14, in the second method of using the present invention, the plurality of electrical box layout tools is inserted into fastening holes 7 of the stationary electrical box 6. More specifically, the first cylindrical sections 2 are inserted into the fastening holes 7 of the stationary electrical box 6 in such a way that only the second cylindrical sections 4 are externally extended from the fastening holes 7 of the stationary electrical box 6. Then the back side 92 of the drywall 9 is pressed against the plurality of electrical box layout tools, forcing the electrical box layout tool's cylindrical section 4, to traverse through the drywall 9 from the back side 92 as the users apply hand pressure to the front side 91 of drywall 9, where the pressure is applied at the location of the stationary electrical box 6. Due to the fact the second cylindrical sections 4 traverse through the drywall 9, the second cylindrical sections 4 create the plurality of guide openings 94 through the drywall 9. Then the drywall 9 is removed away from the framing stud and the stationary electrical box 6. Upon removing the drywall 9, the users have to inspect the positioning of the plurality of electrical box layout tools so that the first outline 10 can be traced in the back side 92 of the drywall 9.

Figure 11:
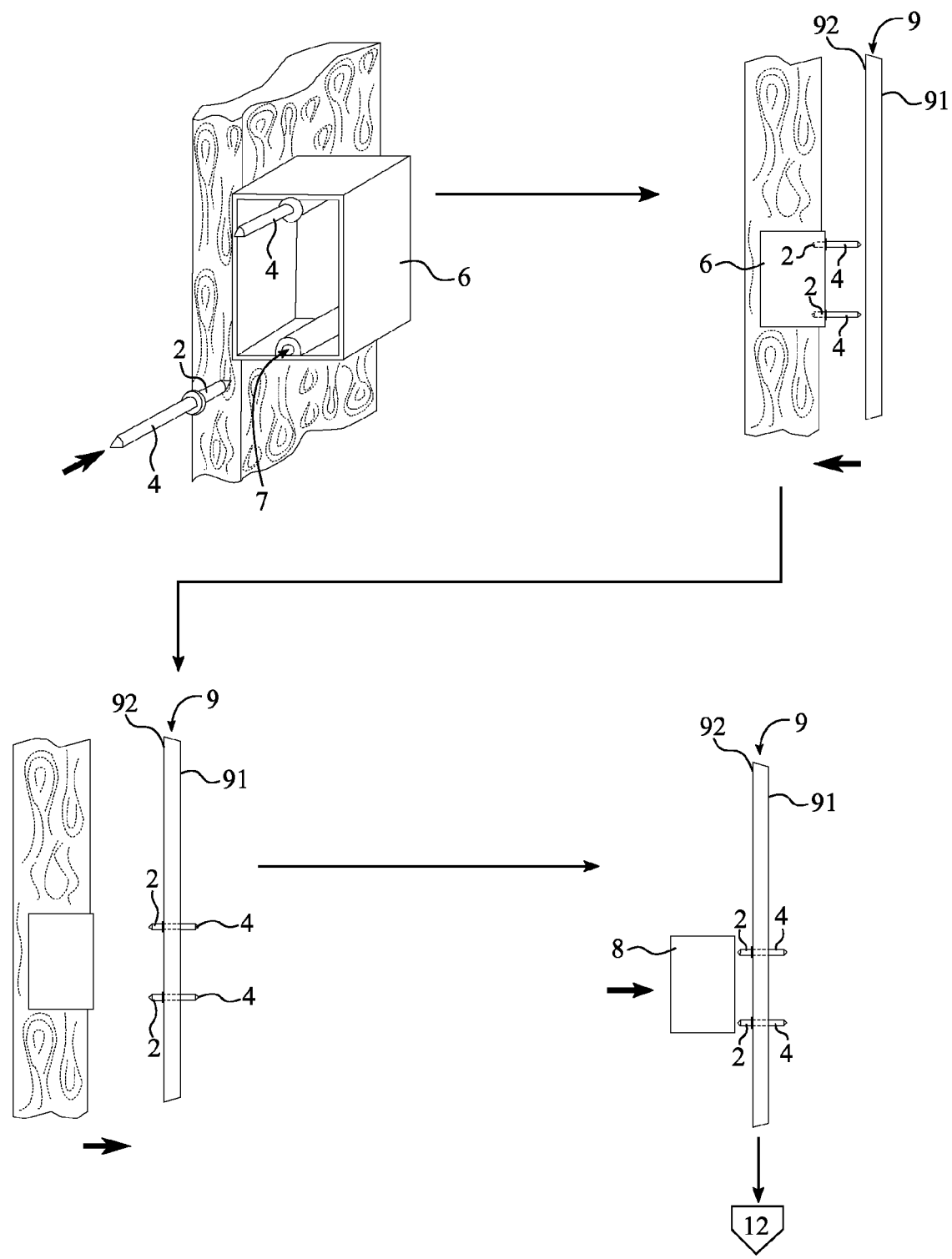
FIG. 11 is an illustration showing a first half for the second method of using the present invention, wherein the electrical box layout tools are retained within the drywall.
Figure 12:
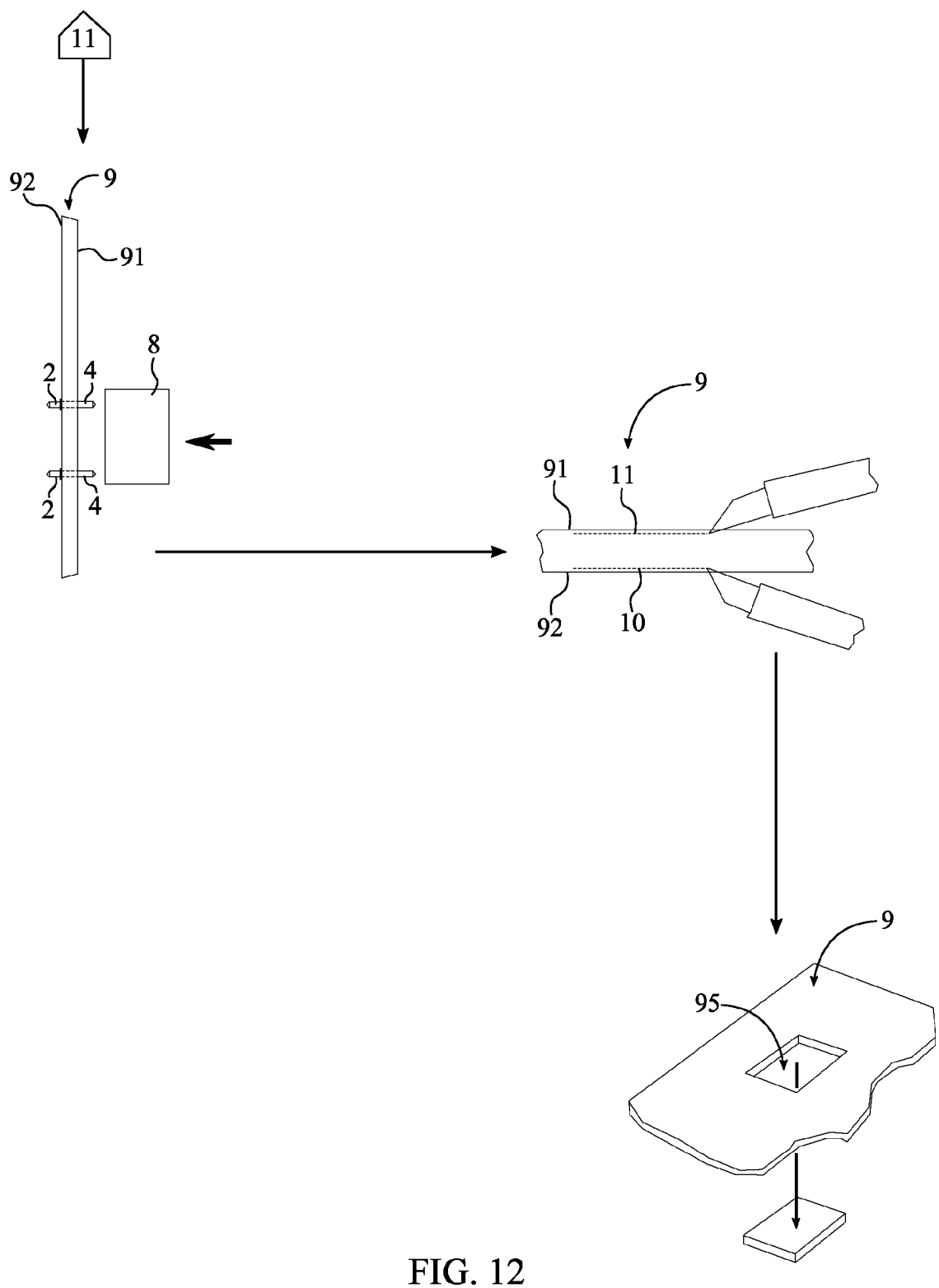
FIG. 12 is an illustration showing a second half for the second method of using the present invention, wherein the electrical box layout tools are retained within the drywall.

In reference to FIG. 11, if the plurality of electrical box layout tools is positioned within the plurality of guide openings 94 of the drywall 9, the at least one arbitrary electrical box 8 is engaged with the first cylindrical sections 2 in order to trace the first outline 10. Since the first cylindrical sections 2 are externally extended from the back side 92 of the drywall 9, the user can easily engage the at least one arbitrary electrical box 8 with the first cylindrical sections 2 to trace the second outline 11.

Figure 13:
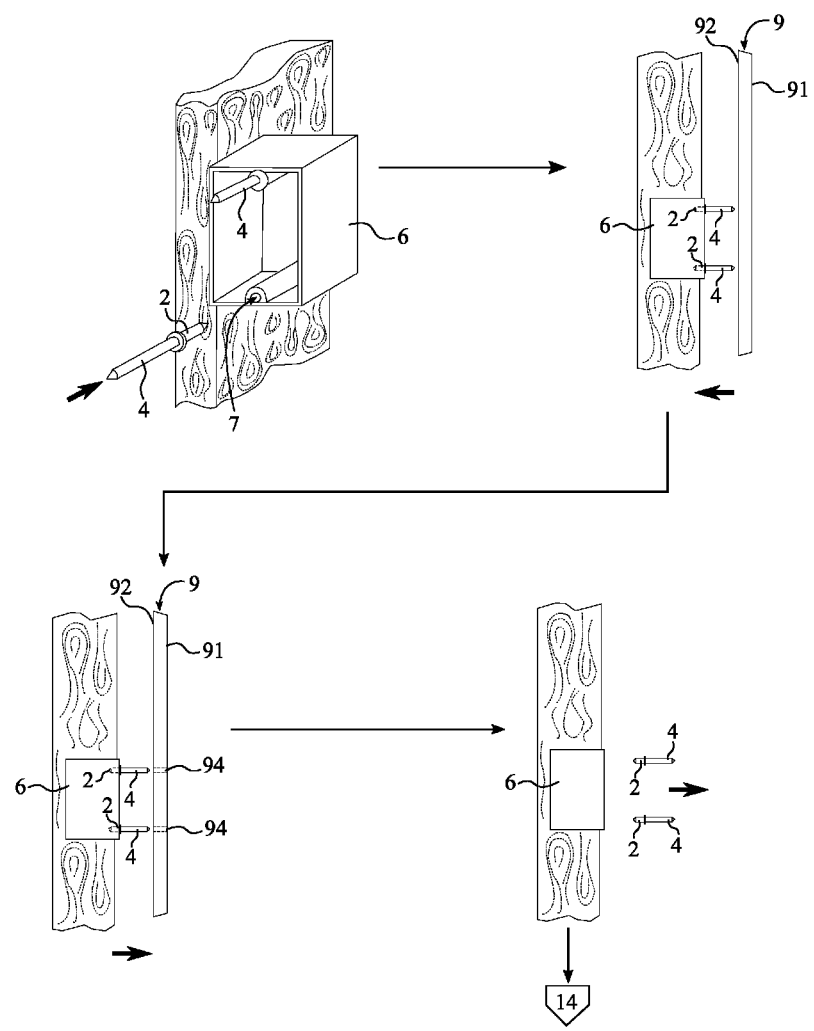
FIG. 13 is an illustration showing a first half for the second method of using the present invention, wherein the electrical box layout tools are retained within the electrical box.
Figure 14:
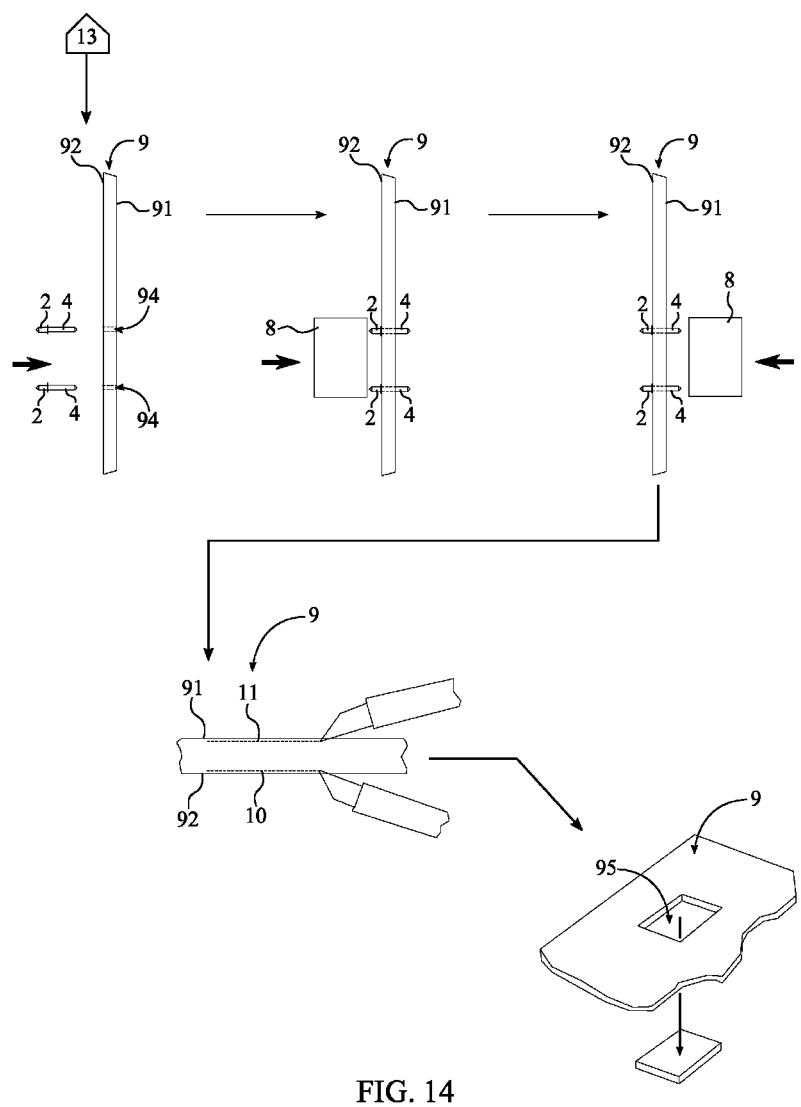
FIG. 14 is an illustration showing a second half for the second method of using the present invention, wherein the electrical box layout tools are retained within the electrical box.

In reference to FIG. 13, if the plurality of electrical box layout tools is positioned within the fastening holes 7 of the stationary electrical box 6, the users are able to identify only the plurality of guide openings 94 within the drywall 9. Then the plurality of electrical box layout tools is removed from the fastening holes 7 of the stationary electrical box 6, and the second cylindrical sections 4 of the plurality of electrical box layout tools are inserted into the plurality of guide openings 94 from the back side 92 of the drywall 9. More specifically, the second cylindrical sections 4 are inserted through the drywall 9 so that the first cylindrical sections 2 are able to extend from the back side 92 of the drywall 9 and the second cylindrical sections 4 are able to extend from the front side 91 of the drywall 9. Then the at least one arbitrary electrical box 8 is engaged with the first cylindrical sections 2 in order to trace the first outline 10.

Once the first outline 10 is drawn within the back side 92 of the drywall 9, the at least one arbitrary electrical box 8 is engaged with the second cylindrical sections 4 from the front side 91 of the drywall 9 so that the second outline 11 can be traced within the drywall 9. Then the drywall 9 is cut through the first outline 10 and the second outline 11 in order to create the opening 95 within the drywall 9.

As for the third method of using the present invention, the plurality of electrical box layout tools is inserted into fastening holes 7 of the stationary electrical box 6. More specifically, the first cylindrical sections 2 are inserted into the fastening holes 7 of the stationary electrical box 6 in such a way that only the second cylindrical sections 4 are externally extended from the fastening holes 7 of the stationary electrical box 6. Then the back side 92 of the drywall 9 is pressed against the plurality of electrical box layout tools and the framing stud in order to force the second cylindrical sections 4 to traverse through the drywall 9 from the back side 92 as the users apply hand pressure to the front side 91 of drywall 9, where the pressure is applied at the location of the stationary electrical box 6. The second cylindrical sections 4 are traversed through the drywall 9, creating the plurality of guide openings 94, and extend from the front side 91 of the drywall 9. Now, the at least one arbitrary electrical box 8 is engaged with the second cylindrical sections 4 in order to trace only the second outline 11. Then the drywall 9 is cut through the second outline 11 to create the opening 95 within the drywall 9 while the drywall 9 is adjacently positioned with the framing stud and the stationary electrical box 6.

Although the invention has been explained in relation to its preferred embodiment, it is to be understood that many other modifications and variations can be made without departing from the spirit and scope of the invention as herein after claimed.

What is claimed is:

1. An electrical box layout tool comprises:
   a first pointed end;
   a first cylindrical section;
   a stopper;
   a second cylindrical section;
   a second pointed end;
   the first cylindrical section being adjacently and concentrically connected with the stopper;
   the second cylindrical section being adjacently and concentrically connected with the stopper opposite of the first cylindrical section;
   the first pointed end being adjacently and concentrically connected with the first cylindrical section opposite of the stopper;
   the second pointed end being adjacently and concentrically connected with the second cylindrical section opposite of the stopper;
   the first cylindrical section being shorter than the second cylindrical section; and
   the first cylindrical section having a smooth outer surface.

2. The electrical box layout tool as claimed in claim 1, where the second cylindrical section having a smooth outer surface.

3. The electrical box layout tool as claimed in claim 1 comprises:
   a plurality of flexible circular fins; and
   each of the plurality of flexible circular fins being radially and externally extended around the second cylindrical section.

4. The electrical box layout tool as claimed in claim 1 comprises:
   a plurality of flexible linear fins; and
   each of the plurality of flexible linear fins being radially and externally extended along the second cylindrical section.

5. An electrical box layout tool comprises:
   a first pointed end;
   a first cylindrical section;
   a stopper;
   a second cylindrical section;
   a second pointed end;
   the first cylindrical section being adjacently and concentrically connected with the stopper;
   the second cylindrical section being adjacently and concentrically connected with the stopper opposite of the first cylindrical section;
   the first pointed end being adjacently and concentrically connected with the first cylindrical section opposite of the stopper;
   the second pointed end being adjacently and concentrically connected with the second cylindrical section opposite of the stopper;
   the first cylindrical section being shorter than the second cylindrical section;
   the first cylindrical section having a smooth outer surface; and
   the second cylindrical section having a smooth outer surface.

6. The electrical box layout tool as claimed in claim 5 comprises:
   a plurality of flexible circular fins; and
   each of the plurality of flexible circular fins being radially and externally extended around the second cylindrical section.

7. The electrical box layout tool as claimed in claim 5 comprises:
   a plurality of flexible linear fins; and
   each of the plurality of flexible linear fins being radially and externally extended along the second cylindrical section.

8. A method of using the electrical box layout tool comprises the steps in combination of:
   providing a stationary electrical box and at least one arbitrary electrical box, wherein the stationary electrical box is mounted to a framing stud;

providing a plurality of electrical box layout tools, wherein each of the plurality of electrical box layout tools comprises a first cylindrical section and a second cylindrical section;

inserting the plurality of electrical box layout tools into fastening holes of the stationary electrical box;

pressing a back side of a drywall against the plurality of electrical box layout tools and the framing stud;

removing the drywall away from the framing stud;

tracing a first outline on the back side of the drywall through the at least one arbitrary electrical box;

tracing a second outline on the front side of the drywall through the at least one arbitrary electrical box;

cutting through the first outline and the second outline in order to create an opening through the drywall, wherein the opening aligns with the stationary electrical box;

inserting the second cylindrical sections into the fastening holes of the stationary electrical box;

pressing the first cylindrical sections into the back side of the drywall in order to create a plurality of shallow holes;

drilling through the plurality of shallow holes from the back side of the drywall in order to create a plurality of guide openings, if the plurality of electrical box layout tools is positioned with the stationary electrical box;

removing the plurality of electrical box layout tools from the stationary electrical box;

inserting the second cylindrical sections into the plurality of guide openings from the back side of the drywall;

engaging the at least one arbitrary electrical box with the first cylindrical sections in order to trace the first outline; and engaging the at least one arbitrary electrical box with the second cylindrical sections in order to trace the second outline.

9. The method of using the electrical box layout tool as claimed in claim 8 comprises the steps of:

removing the plurality of electrical box layout tools from the drywall, if the plurality of electrical box layout tools is positioned with the drywall;

drilling through the plurality of shallow holes from the back side of the drywall in order to create a plurality of guide openings, inserting the second cylindrical sections into the plurality of guide openings from the back side of the drywall;

engaging the at least one arbitrary electrical box with the first cylindrical sections in order to trace the first outline; and engaging the at least one arbitrary electrical box with the second cylindrical sections in order to trace the second outline.

10. The method of using the electrical box layout tool as claimed in claim 8 comprises the steps of:

inserting the first cylindrical sections into the fastening holes of the stationary electrical box; and traversing the second cylindrical sections through the drywall from the back side in order to create a plurality of guide openings.

11. The method of using the electrical box layout tool as claimed in claim 10 comprises the steps of:

engaging the at least one arbitrary electrical box with the first cylindrical sections in order to trace the first outline, if the plurality of electrical box layout tools is positioned within the plurality of guide openings of the drywall; and engaging the at least one arbitrary electrical box with the second cylindrical sections in order to trace the second outline.

12. The method of using the electrical box layout tool as claimed in claim 10 comprises the steps of:

removing the plurality of electrical box layout tools from the stationary electrical box, if the plurality of electrical box layout tools is positioned with the stationary electrical box;

inserting the second cylindrical sections into the plurality of guide openings from the back side of the drywall;

engaging the at least one arbitrary electrical box with the first cylindrical sections in order to trace the first outline; and engaging the at least one arbitrary electrical box with the second cylindrical sections in order to trace the second outline.

* * * * *